United States Patent [19]

Newkirk

[11] Patent Number: 5,074,611
[45] Date of Patent: Dec. 24, 1991

[54] DOOR ASSEMBLY FOR ARMORED CAR

[75] Inventor: Donald R. Newkirk, West Harrison, Ind.

[73] Assignee: O'Gara-Hess & Eisenhardt Armoring Company, Fairfield, Ohio

[21] Appl. No.: 633,022

[22] Filed: Dec. 24, 1990

[51] Int. Cl.[5] .................................. B60J 5/04
[52] U.S. Cl. .......................... 296/146; 296/202; 49/396; 16/82; 16/382
[58] Field of Search ............... 296/146, 202; 49/396, 49/502; 16/247, 382, 82

[56] References Cited

U.S. PATENT DOCUMENTS

| 951,170 | 3/1910 | Younglove | 16/82 |
|---|---|---|---|
| 1,483,357 | 2/1924 | Leguillon | 16/82 R |
| 1,543,912 | 6/1925 | Gammeter | 16/82 |
| 1,588,477 | 6/1926 | Kingston | 16/82 |
| 1,762,629 | 6/1930 | Huesman | 296/202 |
| 2,860,911 | 11/1958 | Cotter | |
| 3,713,691 | 1/1973 | Bayless | |
| 3,782,036 | 1/1974 | Clark et al. | 49/502 |
| 4,290,235 | 9/1981 | Jahnie et al. | |
| 4,306,381 | 12/1981 | Presto | 49/502 |
| 4,316,404 | 2/1982 | Medlin | 296/84.1 X |
| 4,428,157 | 1/1984 | Engelsberger et al. | 49/502 |
| 4,434,580 | 3/1984 | Engelsberger et al. | 49/502 |
| 4,743,062 | 5/1988 | McLaren et al. | |
| 4,800,638 | 1/1989 | Herringshaw et al. | 296/146 |
| 4,850,636 | 7/1989 | McLaren et al. | |

FOREIGN PATENT DOCUMENTS

| 155092 | 1/1953 | Australia | 16/247 |
|---|---|---|---|
| 3026174 | 2/1981 | Fed. Rep. of Germany | 296/202 |
| 29022 | 3/1977 | Japan | 296/22 |
| 2101535 | 1/1983 | United Kingdom | 296/202 |

Primary Examiner—Johnny D. Cherry
Assistant Examiner—Gary C. Hoge
Attorney, Agent, or Firm—Wood, Herron & Evans

[57] ABSTRACT

A sag-resisting door assembly for an armored vehicle. Upper and lower hinges are mounted to the door edge, but at least one of the hinges is also connected through the door edge to an armor panel within the door, rather than being connected to the panel only by the door panel or skin. Preferably a bolt is connected between the movable leaf of the upper hinge and a flange on the door armor panel, through the door edge, and a stop on the armor abuts the movable leaf of the lower hinge.

13 Claims, 1 Drawing Sheet

DOOR ASSEMBLY FOR ARMORED CAR

FIELD OF THE INVENTION

This invention relates to armored vehicles and more particularly to an armored door assembly.

BACKGROUND OF THE INVENTION

The addition of armor to an automobile or other vehicle very substantially increases its weight, thereby requiring that the vehicle frame be reinforced in critical areas to carry the added weight. The armoring of vehicle doors especially stresses the frame because the doors are cantilevered from hinges along the door edge. An armored door is also subject to a very large, abrupt force if it is thrown open or slammed shut. Such stresses tend to cause the door to "sag" relative to the door frame.

The door structure and hinges as supplied by the original vehicle manufacturer are often used by the armorer, with some modification to carry the additional load. Steel or other armor panels are installed between the original inside and outside "skins," panels or liners of the doors; the door skins themselves are not necessarily made heavier to carry the armor. Usually armor panel mounting brackets are attached to the inside of the metal outer skin, and the armor panel is "hung" or suspended from the door structure by such brackets. The weight of the armor panel and the bulletproof glass is typically carried by the door skin, to the door edge to which the hinges are secured.

Experience has shown that the relatively thin gauge metal used for door outer skins (e.g., 18 or 20 gauge) tends to sag under the weight of the armoring, even if so-called lightweight or composite armor is used. The sagging tends to occur progressively with time as the door is repeatedly opened and closed in use; a door which was properly aligned with respect to the frame at the time the vehicle left the shop, gradually becomes increasingly disaligned. At the least such sag is unsightly and undesirable; and ultimately it can prevent closing and latching. Correcting the sagging, once it has occurred, requires realignment and "shimming" (inserting thin spacers between the hinges and their mounts, to return the door to a position of alignment). Such adjustments are inconvenient, specialized, and in any event difficult because of the weight of the door. The door must be supported while the hinges are loosened and one or more shims inserted to correct the sag.

It is therefore desirable to provide an armored door assembly which will be less subject to sagging in use.

The Prior Art

Bayless U.S. Pat. No. 3,713,691 shows an automobile door having a collision plate to which the door hinges are directly attached in order to give greater strength to the door construction. The door itself is hinged only through the armor, and special hinging is required.

Jahnle U.S. Pat. No. 4,290,235 shows an automobile door having an internal, intrusion-resisting strap made of continuous glass fibers and mounted to the outer panel. The hinges are mounted to the outer panel.

McLaren U.S. Pat. No. 4,743,062 shows a car having a door reinforcing beam to one end of which the door hinges are directly attached. The door structure is telescoped over the beam, which is inserted through an opening at one edge of the door. The provision of hinges on the beam rather than on the door is said to enable a closer fit to be obtained.

Brief Description of the Invention

In accordance with this invention the hinges of the armored door may be connected to the door edge as in a conventional armored vehicle, but the door armor panel is also connected directly to at least one hinge, so that the weight of the armor is not transmitted to the hinges just through the relatively light gauge door skin metal. A stop on the armor panel positively abuts the movable leaf of one hinge, preferably the lower hinge, while a second hinge (preferably the upper hinge) is connected both to the door edge and, through the door edge, to the armor. The upper hinge is preferably connected to the armor by a bolt which may be taken up so that the spacing between the armor and the hinge can readily be set as desired at the time the armored door is first hung. Thus, after both hinges have been connected to the door skin, the adjusting bolt is used to "draw up" the door into a position of proper alignment. The stop is then secured to the armor panel in a position abutting the movable lower hinge leaf. The armor does not thereafter sag away from the upper hinge, to which it has been directly bolted. The door skin, which is also connected to the armor, is thereby also prevented from sagging. A flexible strap is preferably provided to connect the armor directly to the vehicle frame or door post, to limit the amount of door opening movement.

Recently there has been a trend toward armoring "low profile" vehicles, i.e., conventional two- and four-door cars and pickups, as distinguished from limousines, so that the vehicle does not draw attention to itself and to reduce the cost of armoring. The armoring used in such vehicles is generally lighter in weight than limousine armoring, and is not designed to have as much penetration resistance, nevertheless the armor panels and the bulletproof glass may still add 150-200 pounds to the weight of each door. This invention is applicable to such low profile armored vehicles, as well as to armored limousines and other vehicles, including helicopters, trucks, vans, and the like.

DESCRIPTION OF THE DRAWINGS

The invention can best be further described by reference to the accompanying drawings, in which.

DETAILED DESCRIPTION

Figure 1:
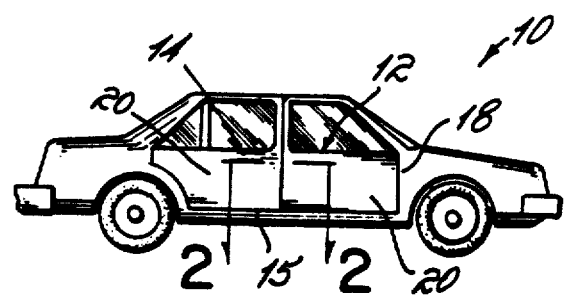
FIG. 1 is a side elevation of an automobile having a door hinge assembly in accordance with this invention.
Figure 2:
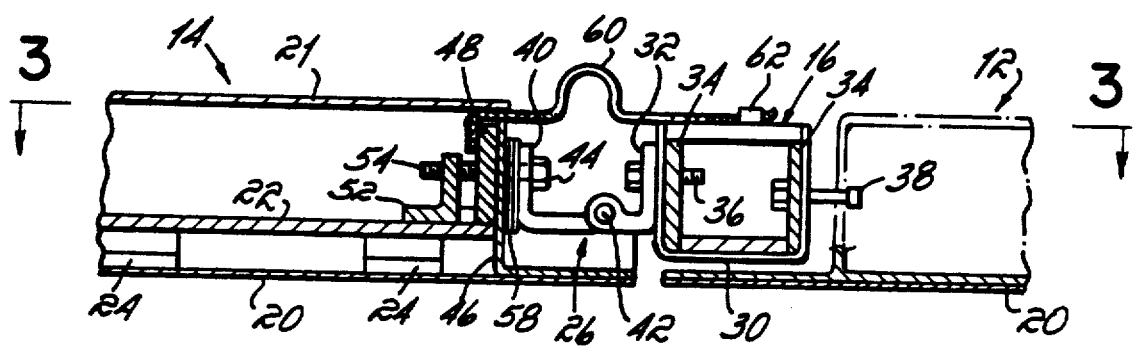
FIG. 2 is an enlarged horizontal section taken on line 2—2 of FIG. 1.
Figure 3:
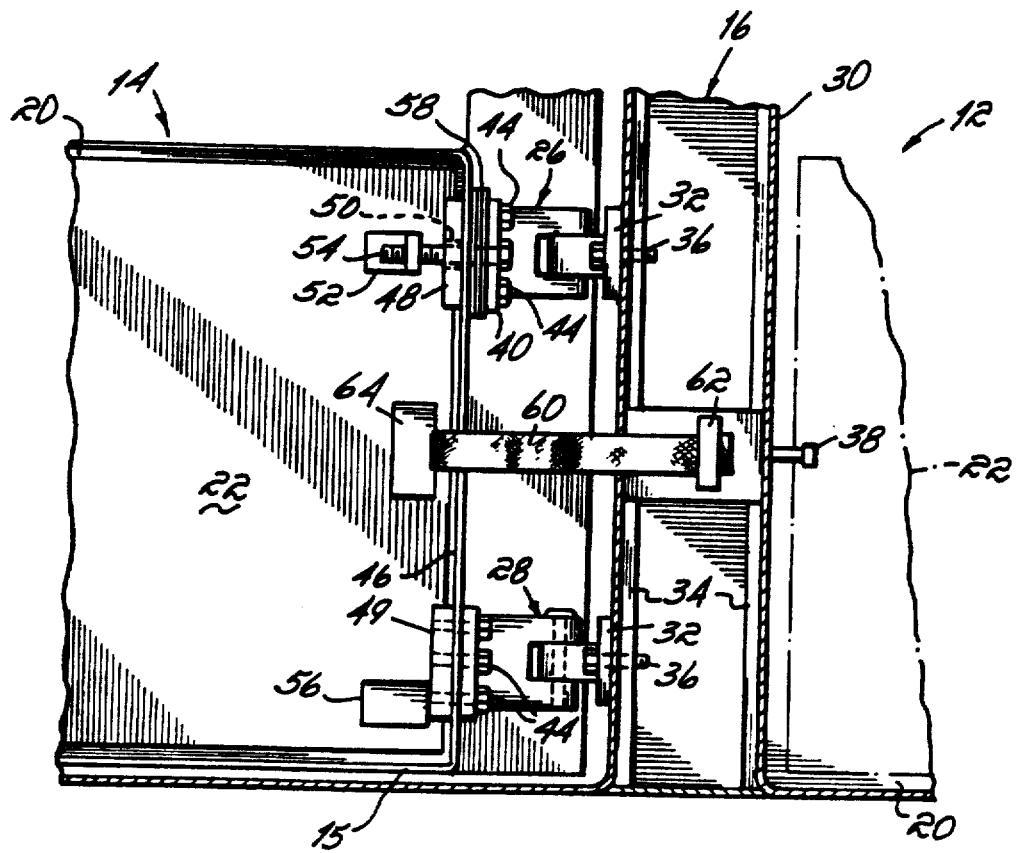
FIG. 3 is an enlarged vertical section taken on line 3—3 of FIG. 2, without the inner liner.

The vehicle 10 shown in FIGS. 1-3 for purposes of explanation is a four-door car which, except for modifications for armoring and hinging in accordance with this invention, may be conventional. The vehicle has front and rear doors 12 and 14. Rear door 14 fits within a door opening surrounded by a door frame 15. Door 14 is hinged along its forward edge to a pillar or door post 16 (sometimes referred to as the "B-pillar") which extends between the floor and roof of the vehicle between the doors. Front door 12 is hinged to front frame structure (the "A-post") at the cowl 18. The manner in which the front door is hinged may be generally similar to that in which the rear door is hinged, and for that reason is not shown. When the doors are closed the posts and hinges are covered from view by the door outer skins or panels 20 and the inner skins or liners 21 (FIG. 2). The inner liners include various cutouts to accommodate the window mechanism and handles, which are not related to the invention.

Each door 12 and 14 includes an internal door armor panel 22 which may for example be of steel. Panel 22 fits inside the door between the outer and inner skins 20 and 21, and is mounted to the door frame structure or outer skin as by welded brackets 24. Door 14 is mounted to post 16 by at least two hinges, an upper hinge 26 and a lower hinge 28. In the vehicle shown both hinges are below the window, which is not shown in detail. In an automobile, hinging in accordance with the invention usually eliminates the need for a third hinge to carry the added weight of the armor.

In the vehicle as supplied by the original manufacturer, door post 16 may be in the form of a U-sectioned sheet metal channel 30. The hinges 26, 28 have fixed ends or leaves 32 which are bolted to the pillar. Because of the weight of the armor it is desirable that the pillar be reinforced by adding backup or reinforcement plates 34 inside channel 30, as is already known. Plates 34 are positioned so that the bolts 36, which secure the fixed leaves 32 of the hinges to the pillar, are threaded and tightened into the plates. A striker pin 38, for latching front door 12, extends forwardly from post 16, and the post may be internally reinforced adjacent the striker pin by another reinforcement plate 34. In the embodiment illustrated the plates 34 are shown as forming a box-like configuration inside the post, however it should be appreciated that the specific shape of reinforcement to carry the additional stress imposed by the armoring will be configured to fit the design of the specific vehicle post. The A-post to which the front door 12 is hinged is of course shaped differently and has no striker pin, and will have a different specific configuration of reinforcement.

Each hinge 26, 28, comprises two leaves or halves, the fixed leaf 32 which is secured to the door frame or pillar, and a pivoting or movable leaf 40 which is secured to the door. The two leaves are pivotally journaled by a bushing and pin which should be of heavy duty construction. In the embodiment shown both the fixed and the movable leaves 32, 40 of the hinges are L-shaped and pivot about an axis 42 between them; however, it should be appreciated that either or both leaves of the hinge may be straight or otherwise configured to correspond with the configuration of the pillar or door edge.

The movable leaves 40 of both door hinges are attached to the door edge 46 by two or more bolts 44, 44. (Alternatively, the movable leaves of the door hinges can be attached directly to door skin 20, rather than by door skin edge 46.) Since the door side edge 46 is a skin of relatively thin sheet metal, it is conventional to provide a tapping plate 48 on door skin 46, within the door, to provide a base into which the bolts 44, 44 can be threaded. One or more shims 58 may be inserted between door edge skin 46 and the movable leaves of the upper and/or lower hinges, to position the door in proper alignment in the opening. In the configuration shown, there are three bolts 44 in the movable leaf of each hinge 26, 28. All the bolts are secured into the tapping plates, except that in accordance with this invention at least one bolt 54 extends through an oversize opening 50 in the associated tapping plate 48, into an angle bracket 52 which is welded to armor plate 22.

Bolt 54 comprises means for adjusting the position of the armor relative to the door frame and the associated hinge. In preferred form, it is the central bolt 54 of the movable leaf of the upper hinge which extends through an oversize hole in its associated tapping plate and is secured to the armor bracket 52. Lower hinge 28 may be similar to upper hinge 26, and is bolted to a lower tapping plate 49 on the door edge. An adjusting screw is not necessary on the second hinge, all three bolts 44 being secured directly to the tapping plate 49. A stop block 56 is secured, as by welding, directly to armor plate 22 so that the stop abuts the tapping plate 49 secured to the lower hinge 28.

The hinges 26, 28 may thus be connected to the door skin as in a conventional vehicle, but in addition the armor plate 22 is bolted to the upper hinge and physically abuts the lower hinge. The center of mass of the door (which lies to the left of the hinges, as viewed in FIG. 3) exerts a counterclockwise torque on the upper hinge, and thrusts stop plate 56 against the lower tapping plate 49 and, through the tapping plate, against lower hinge 28. The weight of the armor is also applied to upper hinge leaf 40, through upper tapping plate 48, by adjusting screw 54 which is connected to the armor through bracket 52.

As indicated before, a third hinge is not usually needed for an automobile door; if one is used, it may be mounted between the two hinges already described, to function as a "neutral" conventional hinge.

The manner in which the door is mounted and installed as follows: With the door supported, the hinges are first bolted to the tapping plates 48 and 49. Adjusting screw 54 is then taken up so that the armor pulls directly on the upper hinge. Stop block 56 is then positioned snugly against the lower tapping plate, and is welded or otherwise secured to the armor in that position. Together, the stop block and the adjusting bolt positively prevent the door skin from sagging under the weight of the armor, the bolt being held in tension and the stop in compression.

It should be noted that an adjustable stop could be used at the lower hinge, rather than the fixed stop shown for purposes of explanation. Further, the principles of the invention can be used by providing a fixed abutment or connection at the upper hinge and an adjustable connection at the lower hinge, that is, by reversing the arrangement described above.

From the foregoing it can be seen that the door can be hinged in a conventional manner, but that the armor is also connected through the door edge, directly to the hinges. Should shimming be necessary at the time of armoring, it can be added in the conventional manner, between the movable hinge leaf and the door edge. Testing to date has demonstrated that an armored door so hinged is far less susceptible to sagging in use than an otherwise similar armored door without the invention.

As an optional further feature of the invention, it is desirable to provide a flexible limit strap to prevent the door from being opened too far. While it is known to use a strap to limit the amount of door opening movement, such straps have conventionally been connected between the post and the door skin. However, if an armored door is opened too far too quickly, tension on the strap when it stops the door is applied to the skin and may cause the skin to bend and deform. In the present invention a strap 60 is preferably connected at one end 62 to a reinforcement on the door pillar 16, rather than being connected to the skin, and extends between the inner skin or liner 21 and the door edge 46, to a point of attachment to the armor, preferably to a flange 64 welded to the armor. Thus the stress of stopping the opening movement is applied to the armor rather than to the skin.

Having described the invention, what is claimed is:

1. A door assembly for an armored vehicle comprising;
    a door frame,
    a door having a door skin including inner and outer skin panels and a door side edge therebetween,
    at least two vertically spaced hinges mounted to said door frame adjacent said door side edge,
    each said hinge having a pivoted leaf secured to said door skin,
    a door armor panel between said skin panels of said door,
    means connecting said armor panel to at least one of said skin panels, the weight of said armor panel tending to cause said skin panel to sag about said hinges and thereby disalign said door in said frame,
    securing means fastening the pivoted leaf of one of said hinges to said door armor panel, and
    stop means on said armor panel exerting a thrust force against the pivoted leaf of the other one of said hinges, said other hinge not being fastened to said stop means.

2. The door assembly of claim 1 wherein said securing means comprises a bolt which is fastened to said armor panel for adjusting the position of said panel relative to said one of said hinges while each said hinge remains secured to said skin.

3. The door assembly of claim 1 or 2 wherein said door side edge is reinforced with tapping plates to which said pivoted leaves of said hinges are bolted.

4. The door assembly of claim 3 wherein said securing means is a bolt which extends from one said pivoted leaf through a tapping plate, into a bracket mounted to said armor panel.

5. The door assembly of claim 4 wherein said bolt extends through an oversize hole in said tapping plate, and is threaded into a bracket mounted to said armor panel.

6. The door assembly of claim 1 wherein the pivoted leaf of each said hinge includes a flange parallel to said door side edge.

7. The door assembly of claim 1 wherein at least one shim is inserted between the pivoted leaf of one said hinge and said door side edge.

8. The door assembly of claim 1 wherein said securing means fastens the pivoted leaf of the upper one of said hinges to said armor panel, and
    said stop means exerts a thrust force on the pivoted leaf of the lower one of said hinges,
    said armor panel not being fastened to said lower one of said hinges.

9. The door assembly of claim 1 further wherein said stop means is a bracket secured to said armor panel, adjacent the lower one of said hinges.

10. The door assembly of claim 1 wherein said hinges are mounted to a door pillar.

11. A door assembly for an armored vehicle, comprising;
    a door frame,
    a door having inner and outer skins and a door side edge therebetween,
    at least two vertically spaced hinges mounted to said door frame adjacent said door side edge,
    each said hinge having pivoted leaf secured to said door side edge,
    a door armor panel between said skins of said door,
    means connecting said armor panel to at least one of said skins,
    means securing the pivoted leaf of one of said hinges to said door armor panel,
    stop means on said armor panel exerting a thrust force against the pivoted leaf of the other one of said hinges, and
    a limit strap connected between said frame and said armor panel.

12. The door assembly of claim 1 wherein said armor panel is mounted to said door outer skin panel.

13. A door assembly for an armored vehicle having a body presenting a door opening and a door pillar at one side of said opening, said assembly comprising;
    an armored door for closing said opening, said door having interior and exterior skins, said skins presenting a door side edge, and a door armor panel between said skins, said armor panel being mounted to at least one of said skins,
    an upper hinge and a lower hinge each having a fixed leaf mounted to said pillar and a pivoted leaf fastened to a tapping plate on said door edge,
    a bolt connected from the pivoted leaf of said upper hinge through said door side edge and said tapping plate, to a bracket mounted to said armor panel,
    a stop mounted to said armor panel, said stop bearing against the pivoted leaf of said lower hinge,
    the weight of said armored door tending to cause said door to sag relative to said hinges thereby putting said bolt in tension and said stop in compression, thereby limiting such sagging.

* * * * *